(12) United States Patent
Griggs

(10) Patent No.: US 6,759,774 B1
(45) Date of Patent: Jul. 6, 2004

(54) LOW SPEED CANNED MOTOR

(75) Inventor: Paul Griggs, Baton Rouge, LA (US)

(73) Assignee: Lawrence Pumps, Inc, Nashua, NH (US)

( * ) Notice: Subject to any disclaimer, the term of this patent is extended or adjusted under 35 U.S.C. 154(b) by 0 days.

(21) Appl. No.: 10/093,899

(22) Filed: Mar. 8, 2002

Related U.S. Application Data

(60) Provisional application No. 60/274,282, filed on Mar. 8, 2001.

(51) Int. Cl.[7] .................................................. H02K 5/10
(52) U.S. Cl. .............................. 310/87; 310/88; 310/89
(58) Field of Search .......................... 310/87, 86, 89, 310/90; 417/423.1–423.14

(56) References Cited

U.S. PATENT DOCUMENTS

| | | | |
|---|---|---|---|
| 4,885,494 A | * | 12/1989 | Higashi ...................... 505/166 |
| 4,990,068 A | | 2/1991 | Zhong et al. ............ 417/423.8 |
| 5,019,738 A | * | 5/1991 | Weilbach et al. .......... 310/90.5 |
| 6,242,825 B1 | * | 6/2001 | Mori et al. .................... 310/45 |
| 6,447,271 B2 | * | 9/2002 | Ojima et al. ............. 417/410.4 |

OTHER PUBLICATIONS

Mcann, L. Thomas, H–Coal Pilot Plant —Topical Report —Rotating Equipment Test Program (With Separate Proprietary Appendix). Jun. 1983, 4 pages (cover 7, 16, appendix A pg 3, Ashland Synthetic Fuels, Inc. Ashland, KY (under contract with US Dept of Energy —DE AC05–76ET10143).

* cited by examiner

*Primary Examiner*—Thanh Lam
(74) *Attorney, Agent, or Firm*—Maine & Asmus

(57) ABSTRACT

A canned motor comprising a rotor assembly having at least 6 poles, a stator assembly, and an isolating can separating the rotor assembly and stator assembly. The canned motor an $L^3/D^4$ ratio of less than 50, and first and second frictionless bearings positioned on the rotor shaft.

18 Claims, 8 Drawing Sheets

ISOFLOW CANNED MOTOR UNIT

ISOFLOW CANNED MOTOR UNIT EXPLODED

ROTOR ASSEMBLY EXPLODED

STATOR ASSEMBLY EXPLODED

BEARING HOUSINGS EXPLODED

LOW SPEED CANNED MOTOR

This application claims priority to U.S. Provisional Application No. 60/274,282 filed on Mar. 8, 2001, which is incorporated by reference herein in its entirety.

I. BACKGROUND OF INVENTION

The present invention relates to electric motors and in particular, electric motors which are known in the art as "canned" or "sealless" motors.

Canned motors are well known in the art and an example of such motors may be seen in U.S. Pat. No. 4,990,068 which is incorporated by reference herein in their entirety. The term "canned" is derived from the fact that a first metal cylinder or "can" surrounds the rotor (the "rotor can") while a second metal cylinder fits between the rotor can and the stator (the "stator can"). A small gap, approximately 30/1000 of an inch, is created between the rotor and stator cans which allows cooling fluid to flow between the cans and extract heat from the motor. Additionally, the same fluid typically passes over the rotor shaft bearings on each eyed of the motor in order to cool and lubricate those bearings.

Canned motors are widely used to power pumps, mixers and the like in the petro-chemical industry. In such an arrangement, the pump or mixer is typically connected directly to the motor body. This eliminates the need for a separate, external seal at the point where the motor shaft engages the pump. Quite often, the fluid being pumped or mixed is also used as the cooling fluid. Because the fluid is often corrosive, sleeve bearings are a typically used in such canned motors since this type of bearing tends to be more resistant to corrosion. However, an inherent disadvantage of sleeve bearings is that they should be rotating at higher motor speeds (e.g. 1800 or 3600 rpm) in order for an effective film of lubricating fluid to form between the sleeves of the bearing. Therefore, at lower motor speeds (e.g. 1200, 900, 600 rpm), sleeve bearings are quickly damaged by failure of effective lubrication. However, the net positive suction head available (NPSHA) in many petro-chemical applications is on the order of 5 to 10 feet of head. Pumps operating at lower motor speeds typically have a lower net positive suction head required (NPSH$_R$) and are more likely to meet the general pump design requirement of the NPSH$_A$ being greater than the NPSH$_R$.

An alternative to using canned motor pumps is to use convention air gap motors (which can effectively operate at lower motor speeds) attached to a separate pump. A common example of this pump arrangement is vertical cantilever styled packed, Lawrence pumps. However, this pumping arrangement, as alluded to above, requires the use of a separate seal where the motor shaft engages the pump. Several factors may lead to the failure of these seals which could allow the escape of potentially explosive or toxic materials being pumped.

Furthermore, prior art motor/pump assemblies (whether canned motors or air gap motors) typically have an $L^3/D^4$ ratio of 50 or more. The $L^3/D^4$ ratio is defined as the overhung shaft length (L) measured between the axial centerline of the bearing closest to the impeller (inboard bearing) and the axial centerline of impeller cubed ($L^3$), divided by the shaft diameter (D), defined as the diameter of the smallest cross section within length L exclusive of the impeller mounting surface, raised to the fourth power ($D^4$). However, the larger the $L^3/D^4$ ratio, the more shaft deflection which is likely to occur. Such shaft deflection may be generated by any unexpected operating conditions such as pump cavitations, closed suction or discharge valves, or improper operating conditions i.e. improper pump selection. The greater this shaft deflection, the greater the wear on seals and bearings in the system. It would be desirable to have an $L^3/D^4$ ratio considerably less than 50.

Another disadvantage of prior art canned motors is their limited axial load thrust capacity and radial load capacity. For example, a 50 or 75 horsepower canned motor with a conventional double acting thrust bearing only has a thrust capacity of approximately 1100 lbs. at 1800 or 3600 rpm. This thrust capacity is considerably reduced if the motor runs at lower speeds. Likewise, a 4.5" diameter, 3" long sleeve bearing only has a radial load capacity of 2000 to 3000 lbs. (depending on the fluid used for lubrication). There is a need in the art for canned motors with considerably higher thrust and radial load capacities, both at higher and lower motor speeds.

II. SUMMARY OF INVENTION

One embodiment of the present invention provides a canned motor comprising a rotor assembly having at least 6 poles, a stator assembly, and an isolating can separating the rotor assembly and stator assembly.

An alternate embodiment of the present invention provides a canned motor comprising a stator assembly, a rotor assembly having a rotor shaft with an $L^3/D^4$ ratio of less than 50, and an isolating can separating between the rotor assembly and stator assembly.

A still further embodiment of the present invention provides a canned motor comprising a rotor assembly including a rotor shaft having a first and second end and a stator assembly. An isolating can separates the rotor assembly and the stator assembly. A first frictionless bearing is position on the first shaft end and the first frictionless bearing is configured to resist an axial shaft load in at least one axial direction. A second frictionless bearing is positioned on the second shaft end and the second frictionless bearing is configured to pass an axial shaft load.

III. BRIEF DESCRIPTION OF THE DRAWINGS

IV. DETAILED DESCRIPTION OF INVENTION

Figure 1:
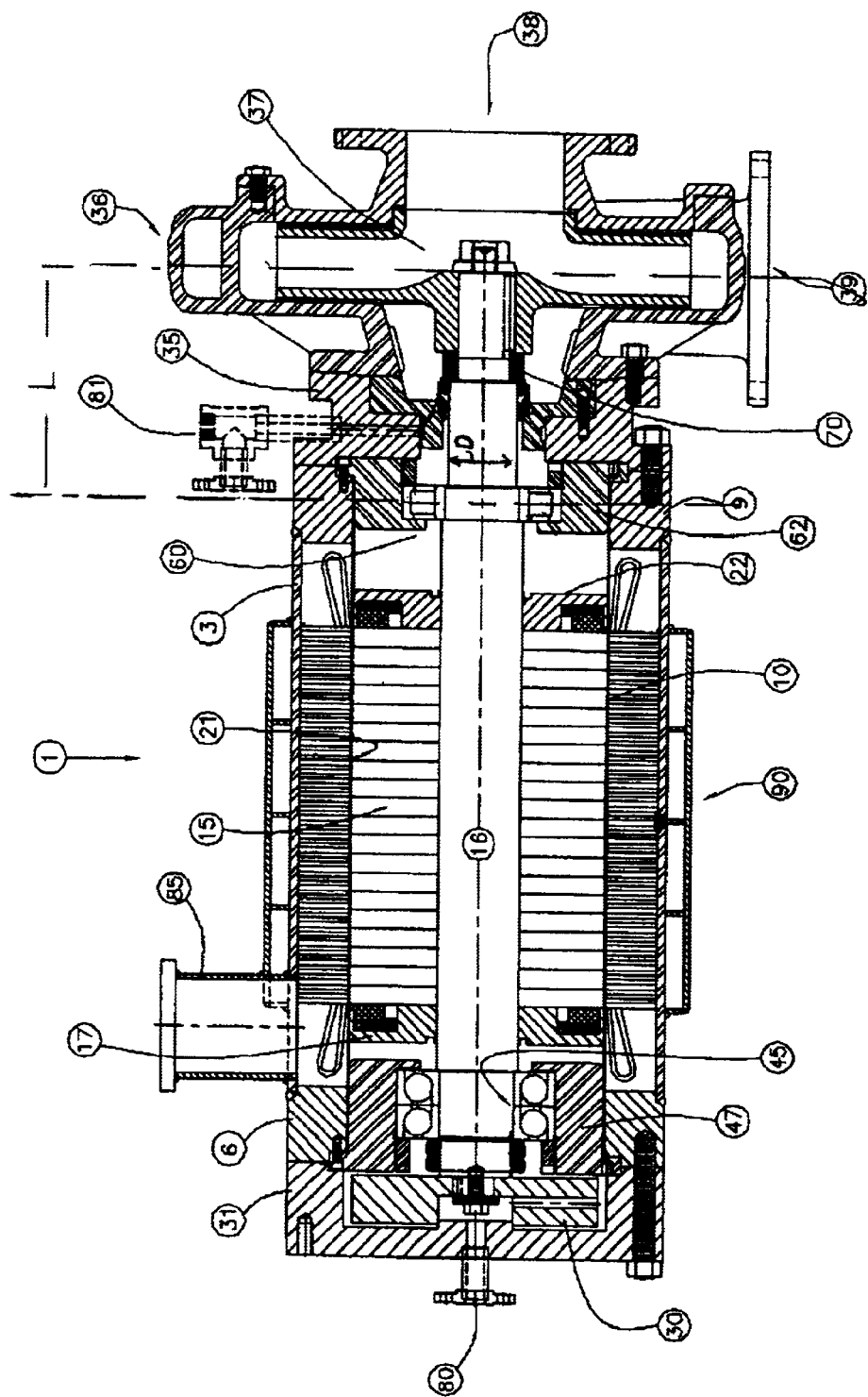
FIG. 1 is cross-sectional view of the canned motor of the present invention with a pump connected thereto.
Figure 2:
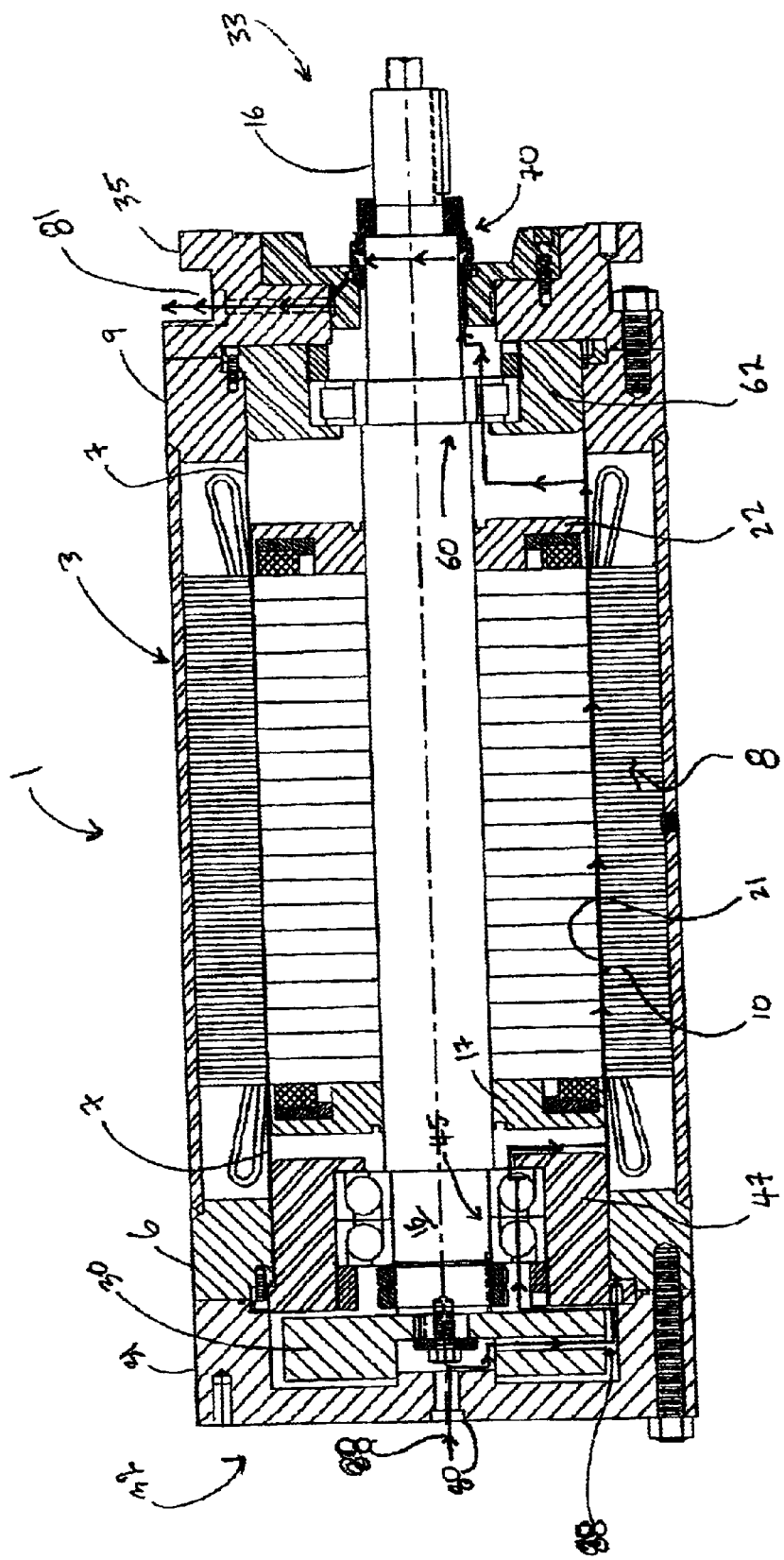
FIG. 2 is cross-sectional view of the canned motor of the present invention without the pump seen in FIG. 1.
Figure 3:
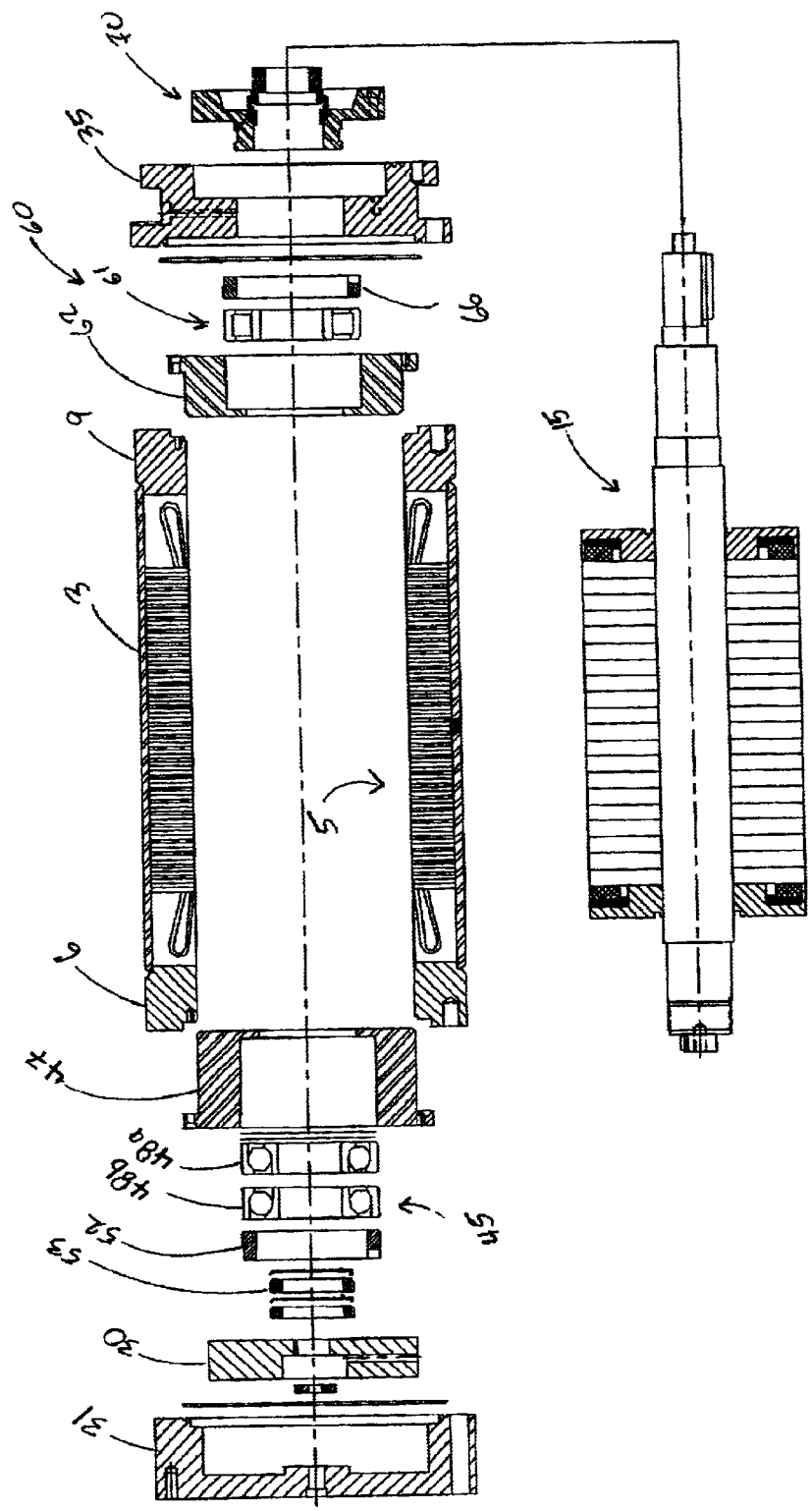
FIG. 3 is an exploded cross-sectional view of the canned motor of the present invention.

FIG. 1 is an assembled cross-sectional view of the canned motor 1 of the present invention as it will be employed with a standard pump. Thus, in addition to canned motor 1, FIG. 1 illustrates a pump housing 36 with a inlet 38, outlet 39, and pump impeller 37. FIG. 2 illustrates canned motor 1 with pump housing 36 and impeller 37 removed while FIG. 3 shows an exploded view of canned motor 1. Canned motor 1 will include a housing 3 with the motor having an inboard end 33 and an outboard end 32. Beginning at inboard end 33, the main components of motor 1 includes mechanical seal 70 through which the end of rotor shaft 16 extends. Mechanical seal 70 engages adapter plate 35 whose outer face is designed to mate with the particular pump housing to be connected to canned motor 1. Positioned behind adapter plate 35 is inboard bearing housing 62 which forms part of inboard bearing assembly 60. Inboard bearing assembly 60 is explained in more detail below in relation to FIG. 6.

Figure 4:
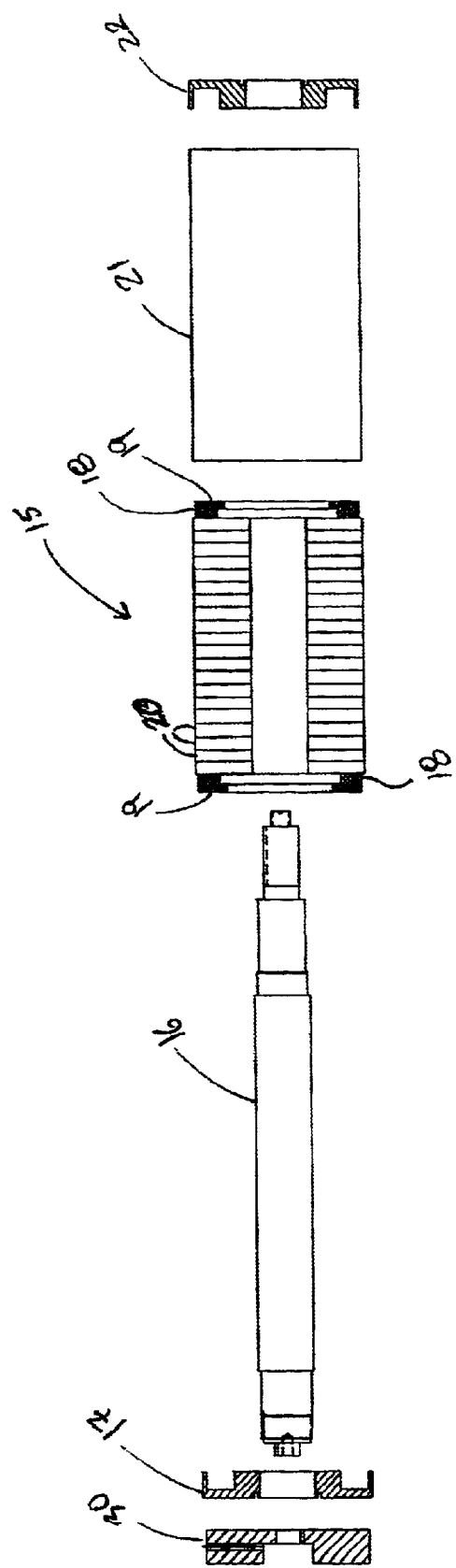
FIG. 4 is an exploded cross-sectional view of the rotor assembly of the canned motor.

Turning to the outboard end 32 of canned motor 1, rear motor cover 31 will house an auxiliary impeller 30 which is connected to the end of rotor shaft 16. Behind auxiliary impeller 30 will be outboard bearing assembly 45 which includes bearing housing 47 and which is also explained below in greater detail. FIG. 3 best illustrates the two main sub-components of canned motor 1, stator assembly 5 and rotor assembly 15. An exploded view of rotor assembly 15 in FIG. 4 shows rotor shaft 16, rotor bars 18 surrounded by laminations 20 and short-out rings 19 on each end of rotor bars 18. As with conventional electric motors, rotor bars 18 will form the "poles" of the rotor and short-out ring 19 will electrically connect the rotor bars 18 on each of their ends. However, unlike conventional canned motors, motor 1 will have a sufficient number of poles for the motor to operate at lower speeds such as 1200, 900, or 600 rpm. The motor speed may be even lower for certain applications, such as a 200 rpm speed for mixing devices. As is well known, the speed of motor 1 will be governed by 7200 divided by the number of poles. Thus, a 1200 rpm motor will require 6 poles, a 900 rpm motor will require 8 poles, and a 600 rpm motor will require 12 poles etc. In a preferred embodiment, motor 1 will have at least 6 poles. However, motor 1 could be provided with 4 or even 2 poles. FIG. 4 also shows the rotor can 21 which is a hollow cylinder formed from $15/1000$ to $20/1000$ inch 316 or 304 stainless steel sheeting material with a diameter sufficient to slide over laminations 20. Naturally, other materials may be used to form rotor can 21 depending on the particular application. Rotor can 21 will be secured in place by welding outboard rotor plate 17 and inboard rotor plate 22 to their respective ends of rotor can 21.

Figure 5:
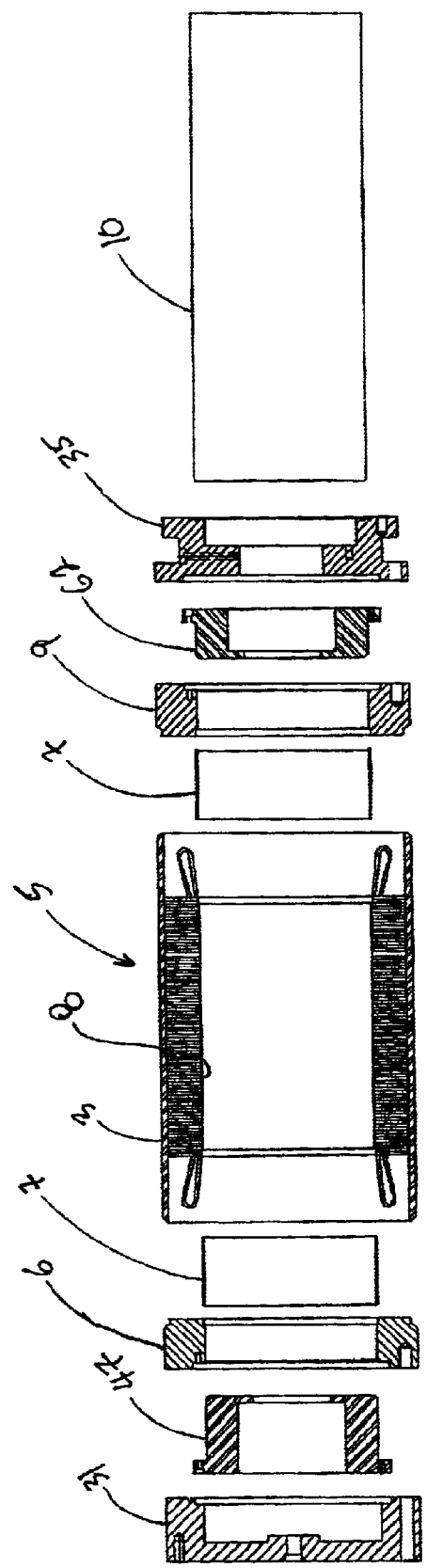
FIG. 5 is an exploded cross-sectional view of the stator assembly of the canned motor.

FIG. 5 illustrates an exploded view of stator assembly 5. Within motor housing 3 will be positioned a series of stator windings 8 as is typical for conventional electrical motors. A stator can 10 formed of a material similar to rotor can 21 and will fit against the inside diameter of stator windings 8. On each end of stator windings 8, there will also be backup rings 7. Backup rings 7 are cylinders of a slightly larger diameter than stator can 10 such that backup rings 7 may slide over the ends of stator can 10 but still maintain a close fit with stator can 10. Backup rings 7 will generally be formed of a thicker sheeting material than stator can 10, for example a sheeting at least $40/1000$ inch thick. However, backup rings 7 may often be thicker depending upon the particular application. FIG. 2 best shows how inboard stator plate 9 and outboard stator plate 6 will be connected to housing 3. It can also be seen that backup rings 7 extend somewhat past and beneath both the stator plates 6 and 9 and stator windings 8. Because of the gap formed between the end of stator windings 8 and stator plates 6 and 9 and the pressure of the cooling fluid (discussed below), it is necessary to employ the thicker, structurally more rigid backup rings 7 than to rely solely on the thinner stator can 10 along this gap between the stator windings and stator plates. The electrical connections to stator windings 8 will communicate through housing 3 by way of the conventional terminal gland 85 seen in FIG. 1.

Figure 6:
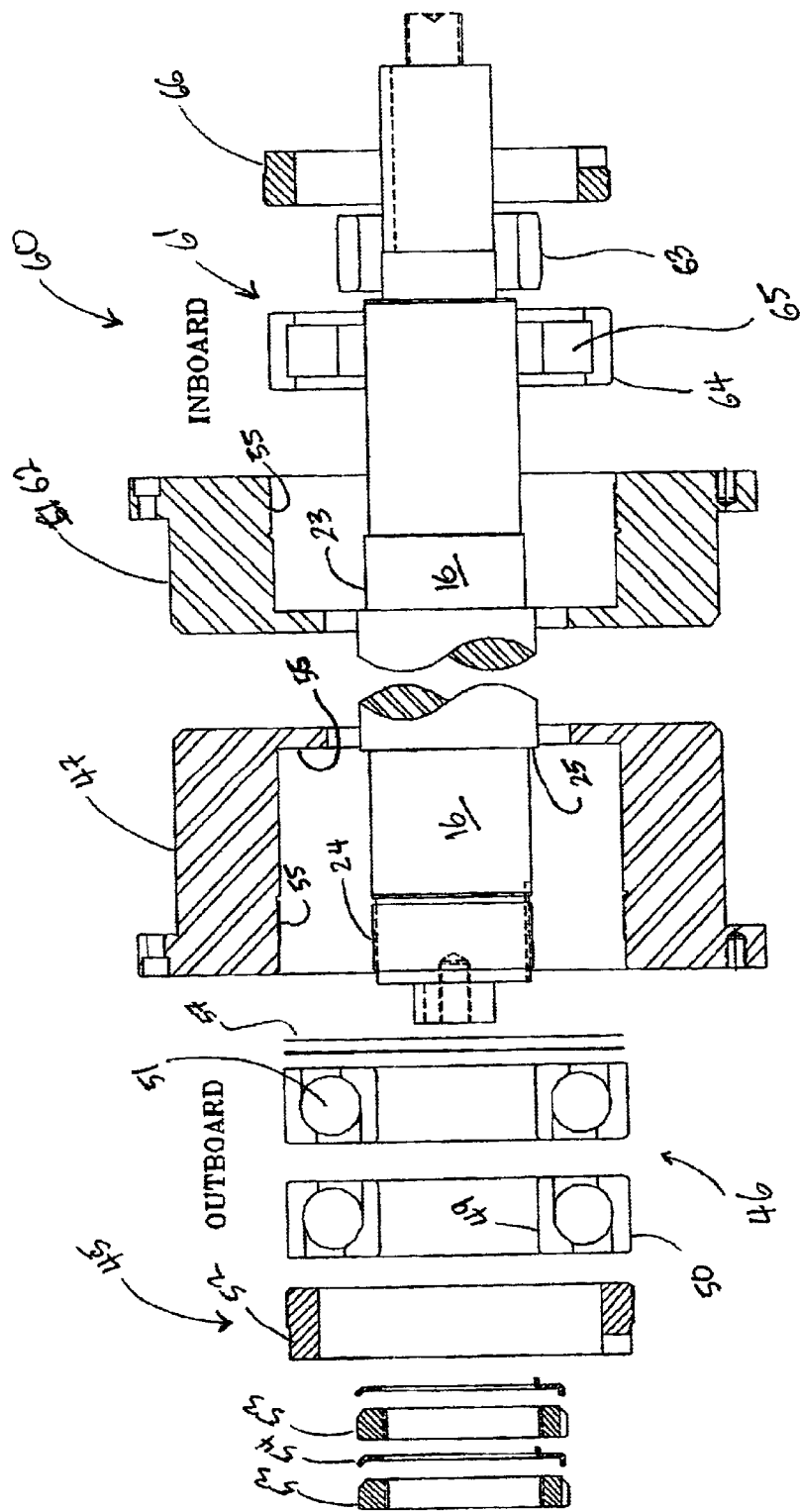
FIG. 6 is an exploded cross-sectional view of the frictionless bearings employed by the canned motor.

As seen in FIG. 2, there will be a bearing assembly 60 on inboard end 33 of motor 1 and a bearing assembly 45 on outboard end 32. FIG. 6 provides an exploded view of both bearing assemblies with the end portions of rotor shaft 16 included for reference. Both bearing assemblies 45 and 60 are "frictionless" bearings. Frictionless bearings normally include a freely moving or rolling component (e.g. a series of balls or cylinders) between two races or other confinement structure. Frictionless bearings may be distinguished from friction bearings (e.g. sleeve bearings) where two moving surfaces directly contact and wear against one another. Examples of frictionless bearings include conventional metal ball bearings, ceramic ball bearings, cylindrical roller bearings, angular contract bearings, double row bearings, needle bearings, taper (or cup and cone) bearings, magnetic bearings and others.

In the embodiment shown in FIG. 6, the outboard bearing assembly 45 is formed by two angular contact bearings 46, such as those designated SKF-7320 40° BEGAM angular contact bearings and available from any standard bearing supply house such as Allied Bearing of Baton Rouge, La. Each angular contact bearing 46 will comprise an inner race 49, an outer race 50, and a series of ball bearings 51. The two angular contact bearings 46 will be positioned within bearing housing 47 and secured there by outer race lock-nut 52 engaging housing threads 55 and inner race lock-nuts 53 and lock washers 54 engaging shaft threads 24. Typically, about 0.05" of shims 57 will be positioned within the bearing housing 47 to ensure proper positioning of the pump impeller. Comparing FIGS. 2 and 6, it will be apparent how this bearing arrangement resists axial shaft loads and prevents axial movement of rotor shaft 16 (with "axial" being in the direction along the length of shaft 16) toward either the inboard or outboard end of motor 1. Rotor shaft 16 is restrained from moving toward the outboard end of motor 1 because shoulder 25 of rotor shaft 16 abuts against bearings 46 which are in turn held in bearing housing 47 by outer race lock-nut 52. Rotor shaft 16 is restrained from moving toward the inboard end of motor because inner race lock-nut on rotor shaft 16 abuts against bearings 46 which are in turn held against inboard movement by real wall 55 of bearing housing 47. The two angular contact beings 46 are shown positioned in a back-to-back arrangement, but could also be positioned in a face-to-face arrangement. As mentioned above, prior art thrust bearings have a comparatively limited thrust capacity. A significant advantage of the bearings 46 shown in the figures is that for a 50 or 75 horsepower canned motor pump, the thrust capacity of 50,000 to 60,000 lbs. may be achieved as opposed to the 1100 lbs. thrust capacity of conventional thrust bearings used in prior art canned motors. In prior art canned motors, careful attention had to be given to certain pump operating characteristics such as maintaining a hydraulic balance across the impeller since impeller hydraulic imbalances created thrust on the bearings and possibly threatened to exceed the 1100 lbs. capacity. However, where the present invention can provide a thrust capacity approximately 50 times that of the prior art, hydraulic balance of the impeller becomes a significantly less important condition and pumps may be operated under a wider range of circumstances. Additionally, the Angular contact bearings 46 have a radial load capacity of approximately 70,000 lbs. as opposed to the 2000 to 3000 lbs. capacity of the sleeve bearing described above.

In the embodiment shown in the figures, the bearing assembly 60 on the inboard end of motor 1 will comprise cylindrical roller bearing 61, such as those designated SKF NU-320 cylindrical roller bearings and available from Allied Bearing of Baton Rouge, La. Cylindrical roller bearing 61 will include an outer race 64, and inner race 63 and a series of cylindrical rollers 65. Inner race 63 will be press fitted onto shoulder section 23 of rotor shaft 16 while outer race 64 and cylindrical rollers 65 will positioned over inner race 63. Outer race 64 will be fixed within bearing housing 62 by way of outer race lock-nut 66 engaging housing threads 55. An important distinction between the arrangement of cylindrical roller bearing 61 and the two angular contract bearings 46 is that the former will allow some axial movement of rotor shaft 16. Thus, if there is a slight thermal expansion of rotor shaft 16, the shaft and the cylindrical rollers 65 may move toward the inboard end of motor 1. Additionally, the cylindrical roller bearings 65 have a radial load capacity of approximately 70,000 lbs. as opposed to the 2000 to 3000 lbs. capacity of the sleeve bearing described above.

Referring to FIG. 1, there is shown the length "L" between the mid-point of cylindrical roller bearing 61 and the hub of impeller 37 as well as the diameter "D" of rotor shaft 16. These dimensions are the basis for determining the $L^3/D^4$ ratio. For the purposes of the present invention, the $L^3/D^4$ ratio should be at least less than 50 and in a preferred embodiment less than 10, and in a still more preferred embodiment, less than 6. The greater the $L^3/D^4$ ratio, the greater tendency rotor shaft 16 has to deflect from its intended centerline. This rotor shaft deflection has a seriously detrimental effect on the efficiency and longevity of bearings and seals positioned along the rotor shaft. Since certain adverse operating conditions (such as pump cavitations, closed suction or discharge valves, or improper operating conditions, i.e. poor pump selection) are relatively common to the pump environment and result in shaft deflection, the shorter $L^3/D^4$ ratio of the present invention will have a significant advantage in extending the useful life of bearings and seals.

Figure 7:
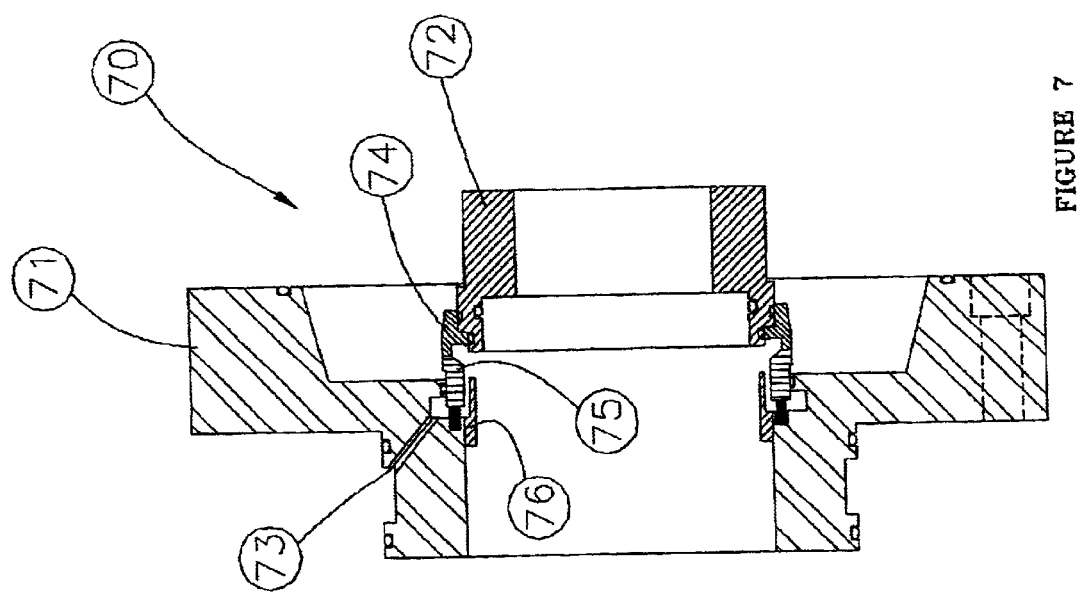
FIG. 7 is cross-sectional view of the mechanical seal employed by the canned motor.

The flow of cooling and lubricating fluid through canned motor 1 is illustrated in FIG. 2. The cooling fluid 88 may either be taken directly from the process stream being pumped, run through motor 1 and returned to the process stream, or a separate source of cooling fluid may used and circulated separate of the process stream. Cooling fluid 88 is drawn into motor 1 through inlet 80 by auxiliary impeller 30. Auxiliary impeller 30 is attached to rotor shaft 16 and will move cooling fluid 88 through motor 1 as long as motor 1 is in operation. Cooling fluid 88 then flows across bearings 46 lubricating and cooling these bearings. Cooling fluid 88 passes between bearing housing 47 and stator plate 17 in order to enter the gap formed between stator can 10 and rotor can 21. It is because of the pressure of cooling fluid 88 at this point that it is necessary to utilize back-up rings 7 described above to strengthen the stator can 10 across the air gap left between stator plate 6 and rotor windings 8. As cooling fluid 88 flows between the rotor and stator cans, it will transfer heat from the stator and rotor. Cooling fluid will then flow between the rotor plate 22 and bearing housing 62 on the inboard end before flowing over bearing assembly 60. Since the embodiment shown in the figures contemplates circulating cooling fluid 88 separate from the process fluid being pumped, the cooling fluid 88 will be directed to a cooling fluid outlet 81 and kept separate from the process fluid by mechanical seal 70. Mechanical seal 70 is best seen in FIG. 7 and in the embodiment shown, comprises a seal model no. SLM6200 available from Flowserve of Baton Rouge, La. Seal gland 71 forms the housing for mechanical seal 70. The drive collar for the rotating face of the seal is formed by hook sleeve 72. A plurality of return port 73 form the return passage for the cooling fluid being pumped through motor 1. Rotating face 74 is attached to hook sleeve 72 while stationary face 75 provides the sealing surface for the seal. A diversion ring or baffle 76 channels the fluid from the outside diameter of the shaft to the seal faces through ports 73 and out of the adapter plate 35 via outlet 81 (see FIG. 1).

Figure 8:
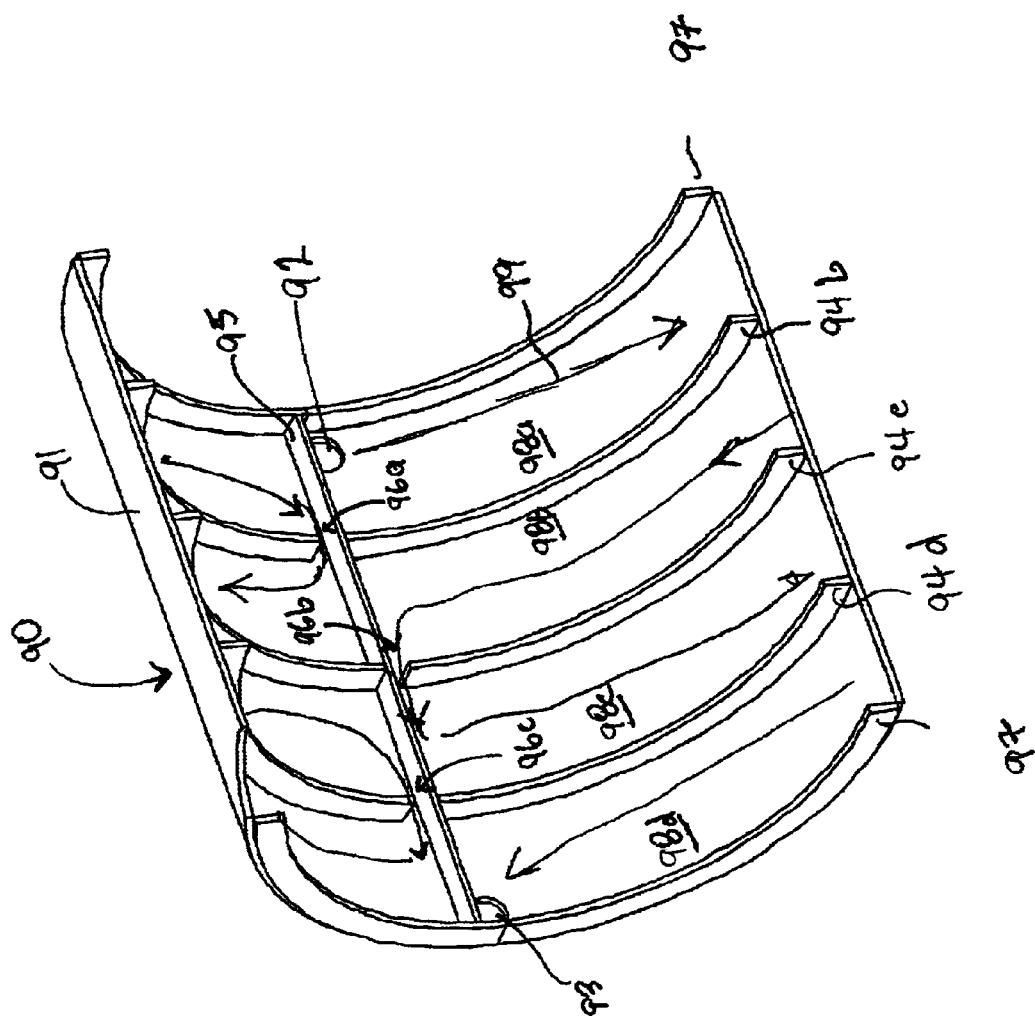
FIG. 8 is a cut-away perspective view of the interior of the cooling jacket used in the present invention.

FIG. 1 also shows a cooling jacket 90 around the housing 3 of motor 1. A cross-section of the internal surface of cooling jacket 90 is seen in FIG. 8. Cooling jacket 90 will include an annular jacket body 91 and end walls 97 which wrap around motor housing 3 to form a water-tight seal. The inside surface of annular body 91 will have a plurality of annular internal dividing walls 94. Annular dividing walls 94 form a series of circular channels which run around the circumference of housing 3 within jacket body 91. A fluid inlet 92 is formed on one end of jacket body 91 and a fluid outlet 93 on the opposite end. A longitudinal dividing wall 95 will run between the two end walls 97 and intersect the annular dividing walls 94. Fluid communication between adjacent channels 98 will be accomplished by way of cross-over passages 96 which are formed by a break in annular dividing walls 94 adjacent to longitudinal dividing wall 95. However, the location of cross-over passages 96 will alternate above and below longitudinal dividing wall 95. For example, cross-over passage 96a is shown positioned above longitudinal dividing wall 95 while cross-over passage 96b is below longitudinal dividing wall 95 and cross-over passage 96c is above longitudinal dividing wall 95. As suggested by fluid flow arrows 99, cooling fluid will enter cooling jacket 90 through inlet 92 and be forced to flow in channel 98a away from longitudinal dividing wall 95. Cooling fluid 99 will travel around the channel 98a until encountering the top side of longitudinal dividing wall 95. At this point, cooling fluid 99 may enter channel 98b through cross-over passage 96a. However, because cross-over passage 98b is on the opposite side of longitudinal dividing 95, cooling fluid 99 cannot directly enter channel 98c. Rather, cooling fluid 99 must travel completely around channel 98b to reach the bottom side of longitudinal dividing wall 95 and the cross-over passage 96b. In this manner, cooling fluid 99 is force to follow a spiral-like path along the entire length of channels 98a 98d before exiting outlet 93. This ensures the cooling fluid has extended contact time with motor housing 3 and can transfer more heat away form housing 3.

Although certain preferred-embodiments have been described above, it will be appreciated by those skilled in the art to which the present invention pertains that modifications, changes, and improvements may be made without departing from the spirit of the invention defined by the claims. All such modifications, changes, and improvements are intended to come within the scope of the present invention.

I claim:

1. A canned motor for a pump assembly comprising:
   a. a rotor assembly having at least 6 poles;
   b. a stator assembly; and
   c. an isolating can separating said rotor assembly and stator assembly, said rotor assembly having a rotor shaft with a first shaft end and an extending second shaft end;
   d. a first frictionless bearing on said first shaft end,
   e. a second frictionless bearing on said second shaft end, and
   f. a mechanical seal on said second shaft end positioned outboard of said second frictionless bearing and sealing said second shaft end in a pump housing.

2. A canned motor according to claim 1, further including:

said first frictionless bearing being configured to resist an axial shaft load in at least one axial direction; and said second frictionless bearing being configured to pass an axial shaft load.

3. A canned motor according to claim 2, wherein said rotor shaft has a $L^3/D^4$ ratio of less than 50.

4. A canned motor according to claim 1, wherein said isolating can further comprises a rotor can positioned within a stator can.

5. A canned motor according to claim 1, wherein said rotor assembly has at least 8 poles.

6. A canned motor according to claim 5, wherein said rotor assembly has at least 12 poles.

7. A canned motor comprising:
a. a stator assembly;
b. a rotor assembly having a rotor shaft with a $L^3/D^4$ ratio of less than 50; and
c. an isolating can separating said rotor assembly and stator assembly.

8. A canned motor according to claim 7, wherein said $L^3/D^4$ ratio of less than 10.

9. A canned motor according to claim 7, said rotor assembly having a rotor shaft with a first shaft end and a second shaft end; a first frictionless bearing on said first shaft end, and a second frictionless bearing on said second shaft end.

10. A canned motor for a pump assembly comprising:
a. a rotor assembly including a rotor shaft having a first shaft end and an extending second shaft end;
b. a stator assembly;
c. an isolating can separating said rotor assembly and said stator assembly;
d. a first frictionless bearing positioned on said first shaft end, said first frictionless bearing being configured to resist an axial shaft load in at least one axial direction;
e. a second frictionless bearing positioned on said second shaft end, said second frictionless bearing being configured to allow axial shaft movement in response to an axial shaft load; and
f. a mechanical seal on said second shaft end outboard of said second frictionless bearing sealing said second shaft end within a pump housing.

11. A canned motor according to claim 10, wherein said first frictionless bearing is configured to resist an axial shaft load in both axial directions.

12. A canned motor according to claim 11, wherein said second frictionless bearing is a cylindrical roller bearing.

13. A canned motor according to claim 10, wherein each said frictionless bearing is either a conventional metal ball bearing, ceramic ball bearing, cylindrical roller bearing, angular contact bearing, double row bearing, needle bearing, taper (or cup and cone) bearing, or magnetic bearing.

14. A canned motor according to claim 1, wherein said $L^3/D^4$ ratio of less than 50.

15. A canned motor according to claim 14, wherein said $L^3/D^4$ ratio of less than 10.

16. A canned motor according to claim 15, wherein said $L^3/D^4$ ratio of less than 6.

17. A canned motor according to claim 7, wherein said $L^3/D^4$ ratio of less than 40.

18. A canned motor according to claim 7, wherein said $L^3/D^4$ ratio of less than 20.

* * * * *